United States Patent
de Pena et al.

(10) Patent No.: US 10,317,882 B2
(45) Date of Patent: *Jun. 11, 2019

(54) PROCESSING OBJECT DATA

(71) Applicant: HEWLETT-PACKARD DEVELOPMENT COMPANY, L.P., Houston, TX (US)

(72) Inventors: Alejandro Manuel de Pena, Sant Cugat del Valles (ES); Sebastia Cortes Herms, Barcelona (ES); Josep Giralt Adroher, Sant Cugat del Valles (ES)

(*) Notice: Subject to any disclaimer, the term of this patent is extended or adjusted under 35 U.S.C. 154(b) by 0 days.

This patent is subject to a terminal disclaimer.

(21) Appl. No.: 16/164,142

(22) Filed: Oct. 18, 2018

(65) Prior Publication Data

US 2019/0049923 A1 Feb. 14, 2019

Related U.S. Application Data

(63) Continuation of application No. 14/888,061, filed as application No. PCT/EP2014/058822 on Apr. 30, 2014, now Pat. No. 10,137,644.

(51) Int. Cl.
*G05B 19/4099* (2006.01)
*B29C 64/40* (2017.01)
(Continued)

(52) U.S. Cl.
CPC .......... *G05B 19/4099* (2013.01); *B29C 64/00* (2017.08); *B29C 64/386* (2017.08);
(Continued)

(58) Field of Classification Search
CPC ............ B29C 67/0088; B29C 67/0092; B28C 67/0051; G05B 19/4099;
(Continued)

(56) References Cited

U.S. PATENT DOCUMENTS 7,917,243 B2 * 3/2011 Kozlak ................... G06F 17/50
264/512
2007/0238056 A1 10/2007 Baumann et al.
2009/0174709 A1 7/2009 Kozlak et al.

FOREIGN PATENT DOCUMENTS

EP 0338751 10/1989
EP 0338751 A2 * 10/1989 ............. B29C 41/12
(Continued)

OTHER PUBLICATIONS

The International Search Report and Written Opinion for International application No. PCT/EP2014/058822 dated Sep. 30, 2014 (11 pages).

*Primary Examiner* — Fernando Hidalgo
(74) *Attorney, Agent, or Firm* — HP Inc. Patent Department

(57) ABSTRACT

In one example, an additive manufacturing system includes a processing system to obtain characteristic data including conditions under which a heat reservoir may be added close to a portion of the object, based on the characteristic data, add sacrificial structure data to the three-dimensional object data for a sacrificial heat reservoir structure close to a portion of the object and not connected to the object, and generate multiple slice images from the three-dimensional object data including the sacrificial structure data.

11 Claims, 6 Drawing Sheets

(51) Int. Cl.
*B29C 64/386* (2017.01)
*B29C 64/00* (2017.01)
*B33Y 50/02* (2015.01)

(52) U.S. Cl.
CPC ............... *B29C 64/40* (2017.08); *B33Y 50/02* (2014.12); *G05B 2219/35134* (2013.01); *G05B 2219/49007* (2013.01)

(58) Field of Classification Search
CPC ........... G05B 2219/35134; G05B 2219/49007; B33Y 50/02
USPC .......................................................... 700/98
See application file for complete search history.

(56) References Cited

FOREIGN PATENT DOCUMENTS

| | | |
|---|---|---|
| GB | 2478067 | 8/2011 |
| WO | WO-2011/098609 | 8/2011 |
| WO | WO-2013/113372 | 8/2013 |

\* cited by examiner

PROCESSING OBJECT DATA

CROSS REFERENCE TO RELATED APPLICATIONS

This is a continuation of U.S. patent application Ser. No. 14/888,061 filed Oct. 29, 2015 which is itself a Section 371 national stage of international application no. PCT/EP2014/058822 filed Apr. 30, 2014.

BACKGROUND

Additive manufacturing systems that generate three-dimensional objects on a layer-by-layer basis have been proposed as a convenient way to produce three-dimensional objects.

An object to be generated may be represented digitally, for example in a suitable computer-aided design (CAD) format. The digital representation of an object to be generated may be processed before being provided to an additive manufacturing system to generate the object.

DRAWINGS

Examples will now be described, by way of non-limiting example only, with reference to the accompanying drawings, in which.

DESCRIPTION

Figure 1:
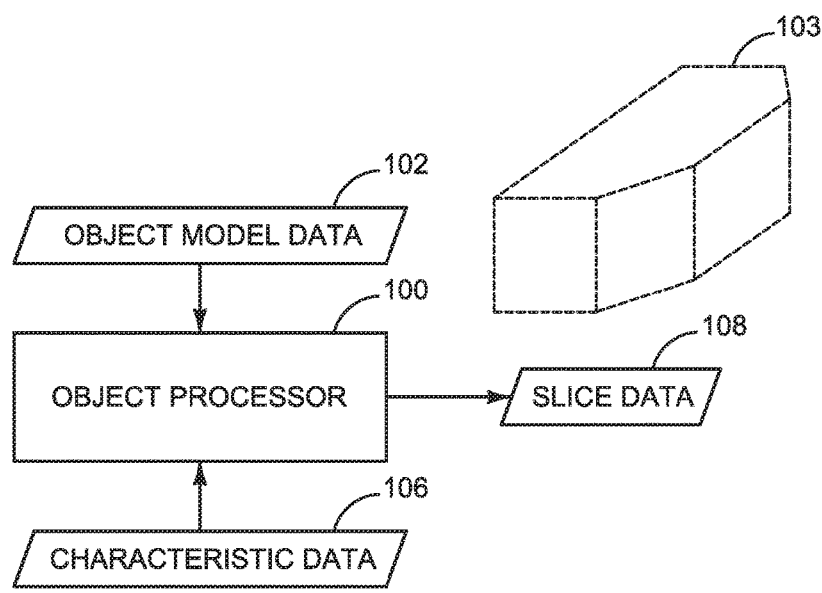
FIG. 1 is block diagram of an object processor according to one example.

Some additive manufacturing systems generate three-dimensional objects through the selective solidification of successive layers of a build material, such as a powdered build material. Some such systems may solidify portions of a build material by selectively delivering an agent to a layer of build material. Some systems, for example, may use a liquid binder agent to chemically solidify build material. Other systems, for example, may use liquid energy absorbing agents, or coalescing agents, that cause build material to solidify when suitable energy, such as infra-red energy, is applied.

Repetition of these processes enables a three-dimensional object to be generated layer-by-layer, through selective solidification of portions of successive layers of build material.

Other kinds of additive manufacturing systems also exist, including fused deposition model (FDM) systems, selective laser sintering (SLS) and light polymerization systems, among others.

According to one example, the digital representation, such as an object model, of an object to be generated may be processed before being provided to an additive manufacturing system to generate the object. The type of processing may depend, for example, on characteristics of the additive manufacturing system on which the object is to be generated.

For example, an additive manufacturing system may unintentionally introduce distortions into objects it generates. This may lead to a generated three-dimensional object not faithfully reproducing a three-dimensional object model used to generate the object. Such distortions may include, for example, geometrical distortions which may cause, for example, various object distortions, such as edge distortions, and surface distortions, to name but a few.

According to examples described herein, different kinds of transformations or processing may be performed on an object model to compensate for any such distortions. An additive manufacturing system may then generate an object based on the transformed object model and produce an object that accurately matches the object described in the original object model.

The processing may, for example, also comprises specific processing based on the type of solidification process used by an additive manufacturing system. For example, PCT Application PCT/EP2014/050841, filed by Hewlett-Packard Development Company on 16 Jan. 2014, the contents and teachings of which are hereby incorporated herein in their entirety, and for which priority is claimed, describes an additive manufacturing system to generate a three-dimensional object. The described system enables the generation of a three-dimensional object through the selective solidification of portions of successive layers of a build material through the selective delivery of multiple agents to layers of a build material. In one example a coalescing agent and a coalescence modifier agent may be selectively delivered to layers of build material.

The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. A coalescence modifier agent serves to modify the degree of coalescence of a portion of build material on which the coalescence modifier agent has been delivered or has penetrated.

In one example, the type of processing performed may be used to generate data to determine on which portions of a layer of build material each of the agents are to be deposited.

The examples described herein are described with specific reference to a multiple agent additive manufacturing system.

It will be understood, however, the examples described herein are in no way limited to use with a multiple agent additive manufacturing system, and may be used, with suitable adaptations, with other suitable additive manufacturing systems. Such other systems may include, for example, selective laser sintering (SLS) systems, selective inhibition sintering (SIS) systems, and fused deposition model (FDM) systems.

System Overview

FIG. 1 illustrates a block diagram of an object processor 100 according to one example. The object processor 100 obtains object model data 102 representing a model 103 of a three-dimensional object to be generated by an additive manufacturing system. The object processor 100 additionally obtains data 106 representing characteristics of the additive manufacturing system on which the object is to be generated.

The object processor 100 is to perform a series of transformations on the obtained object model data 102, taking into account the characteristic data 106 to generate a transformed object model, as will be described further below. Once the transformations have been performed the object processor 100 generates slice data 108.

Figure 2:
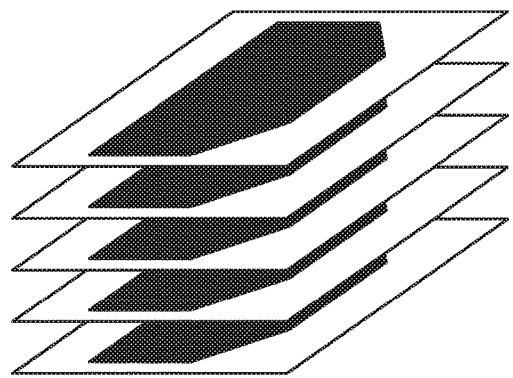
FIG. 2 is an illustration of a number of image slices according to one example.

The generated slice data 108 represents multiple slices of the transformed object model, with each slice represented as an image, as illustrated in FIG. 2. FIG. 2 shows a number of images 202a to 202n, each representing a slice of the transformed object model. It should be noted that the images shown in FIG. 2 are purely illustrative.

Each image 202a to 202n defines a portion or portions of a layer of build material where an agent is to be delivered by an additive manufacturing system. For example, in an additive manufacturing system that uses two agents, such as a coalescing agent and a coalescing modifier agent, each image may define a portion, or portions, of a layer of build material on which a coalescing agent is to be delivered, and may define a portion, or portions, of a layer of build material on which a coalescence modifier agent is to be delivered. In an additive manufacturing system that uses more than two agents each image may define a portion, or portions, of a layer of build material on which each agent is to be delivered.

In one example, each slice may be represented by a single image. For example, each image may include multiple separations or channels, with each channel defining a portion, or portions, of a layer of build material on which a different agent is to be deposited by an additive manufacturing system.

In another example, each slice may be represented by multiple images, with each image of the slice defining a portion, or portions, of a build material on which a different agent is to be deposited by an additive manufacturing system.

Figure 3:
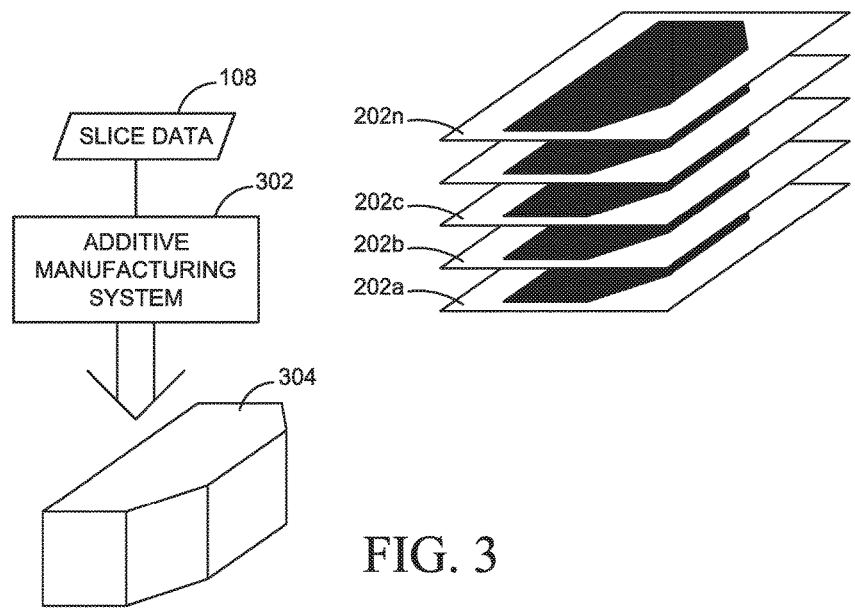
FIG. 3 is block diagram of an additive manufacturing system according to one example.

An example additive manufacturing system 302 is illustrated in FIG. 3. The additive manufacturing system 302 obtains slice data 108 representing slices 202a to 202n and processes the slice data 108 to control the system 302 to generate a three-dimensional object 304. In some examples the additive manufacturing system 302 may perform further processing on the slice data 108 to generate data to control the additive manufacturing system 302 to generate the three-dimensional object 304.

Object Processing

Figure 4:
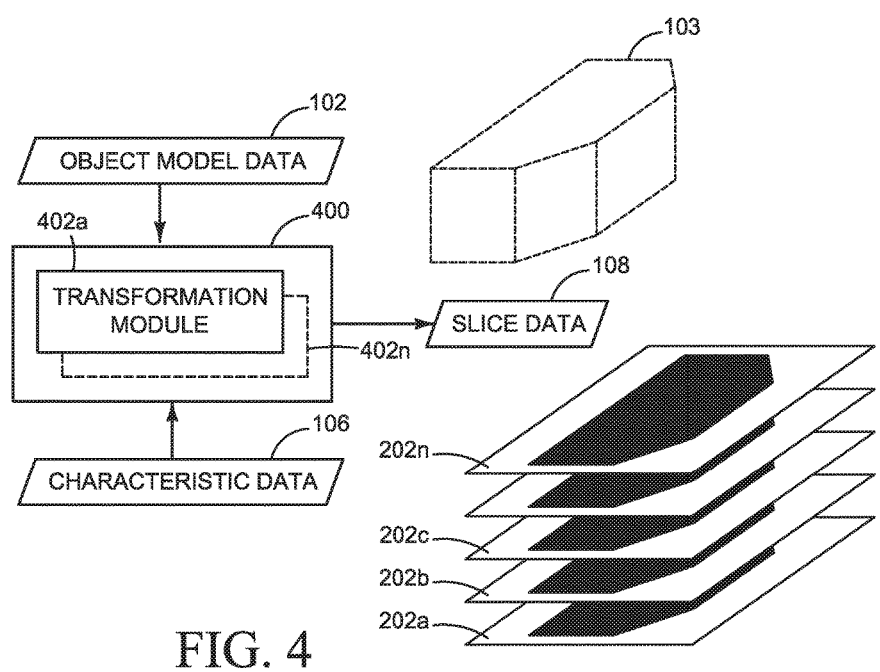
FIG. 4 is a block diagram of an object processor according to one example.

Referring now to FIG. 4, there is illustrated an object processor 400 according to one example.

The object processor 400 comprises one or multiple transformation modules 402, as will be described below in greater detail.

Figure 5:
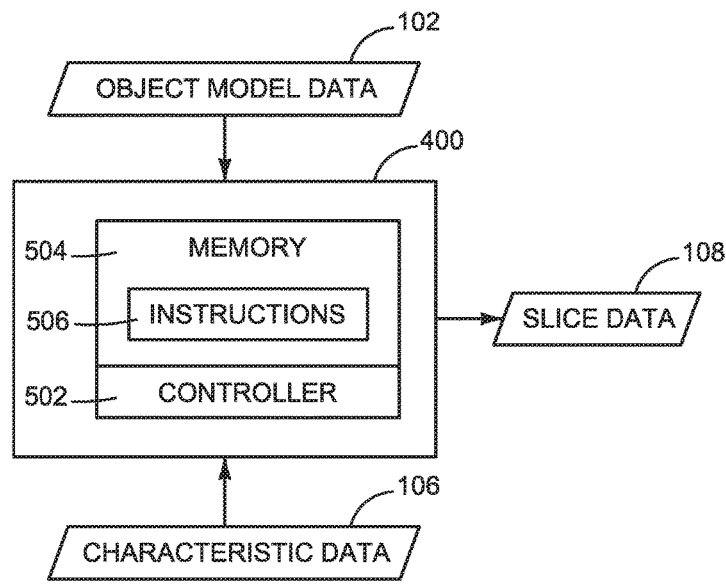
FIG. 5 is a block diagram showing an implementation of an object processor according to one example.

In one example, as illustrated in FIG. 5, the object processor 400 may comprise a controller 502, such as processor, coupled to a memory 504 through an appropriate communications bus (not shown). The memory 504 may store machine readable instructions 506. The controller 502 may execute the instructions 506 to cause the controller 502 to process the object model data 102 to generate slice data 108. The instructions 506 may define processing operations to be performed by the transformation modules described herein.

In another example each transformation module may be implemented using hardware, or a combination of software and hardware.

Geometric Transformations

Figures 6, 7:
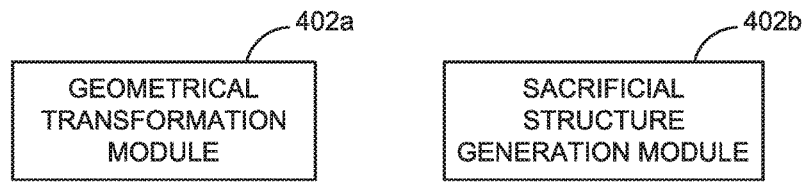
FIG. 6 is a block diagram of a geometrical transformation module according to one example.
FIG. 7 is a block diagram of a sacrificial structure generation module according to one example.

In one example, the object processor 400 comprises a transformation module that is a geometrical transformation module 402a, as illustrated in FIG. 6. The geometrical transformation module 402a may perform one or multiple geometric transformations on the object model data 102 as described herein. The geometric transformations may be applied, for example, to compensate for differences between the object 103 defined in the object model data 102 and the object 304 generated by an additive manufacturing system from the object model. In one example, the geometrical transformation module 402a may be defined in addition to or in substitution of the other modules described further below.

For example, some additive manufacturing systems may unintentionally introduce geometric distortions, such as size distortions, edge distortions, surface distortions, and the like, during the generation of a three-dimensional object. This may lead to a generated three-dimensional object not faithfully reproducing a three-dimensional object model used to generate the object.

The details relating to any such distortions may be included in, or may be derivable from, the characteristic data 106. In one example the characteristic data 106 is obtained from the additive manufacturing system 302. In another example the characteristic data 106 may be obtained from a remote network location, such as a manufacturer's web site, or in any other suitable manner.

For example, through experimentation it may be determinable that the additive manufacturing system 302 unintentionally generates three-dimensional objects that are a smaller by a given percentage in a particular axis or axes. This could occur, for example due to build material contraction during the generation of three-dimensional objects. Such data may be reflected in the characteristic data 106. Accordingly, when the object processor 400 is to process object model data 102 the transformation module may obtain the characteristic data 106 and may apply a suitable geometrical scaling factor to the object model data 102. In this way an object 304 generated by the additive manufacturing system may better conform to the object model 103 defined in the object model data 102.

In another example, distortions may be unintentionally introduced into three-dimensional objects generated by the additive manufacturing system 302 due to factors such as, for example, the heating of build material and the cooling of build material. If such distortions can be quantified they may be included in the characteristic data 106 and used by the transformation module to perform a suitable geometrical transformation module to compensate for any distortion. In one example the characteristic data may include a lookup table.

In one example, the characteristic data 106 may be linked to environmental or other conditions. For example, it may be determined that when the ambient temperature is 20 degrees Celsius a first scaling factor is to be applied in a given axis or axes, whereas when the ambient temperature is 30 degrees Celsius a second scaling factor is to be applied.

In one example, the characteristic data 106 may define characteristics of a build material to be used by an additive manufacturing system. For example, the characteristic data 106 may comprise data relating to physical characteristics of the build material, the age of the build material, the humidity level of the build material, the type of build material, the average particle size of the build material (for powdered build materials), the pureness of the build material, and so on.

In one example the characteristic data 106 may define characteristics of agents used in the additive manufacturing system, such as a coalescing agent and a coalescence modifier agent.

In other words, the characteristic data 106 may comprise any suitable data that may be related to causing, either directly or indirectly, an unintentional geometrical transformation in objects generated by an additive manufacturing system.

In one example a transformation may include applying a global scaling factor to the object model described in the object model data 102. In other examples, a transformation may include complex transformations based on factors that may include: object model geometry; object model surface topology; object model structure; and proximity of structural features within an object model.

In one example the object model data 102 may be described in a suitable vector format that may use, for example, geometrical primitives such as points, lines, curves, polygons, etc. some or all of which may be based on mathematical expressions. Performing transformations on such vector data enables complex object transformations to be performed without degrading the quality of the original data.

Sacrificial Structures Generation

In one example, the object processor 400 comprises a transformation module that is a sacrificial structure generation (SSG) module 402b, as illustrated in FIG. 7. In one example, the SSG module 402b may be present in the object processor 400 in addition to or in substitution of the other transformation modules 402 described herein.

The SSG module 402b generates new features that are added to the object model 103. The new features are features that were not included in the original object model 103. The new features may be structural features that will be generated with the object 304 when the object is generated by the additive manufacturing system 302 but which may be removed prior to the generated object 304 being deemed a final object. For example, at least some of the sacrificial structures may be removed during a manual or automatic post-processing operation.

In one example the SSG module 402b processes original object model data 102, for example when no geometrical transformations are performed on the object model data 102. In another example the SSG module 402b processes object model data that has been modified as a result of geometrical transformations having been performed thereon by the geometrical transformation module 402a.

The type of sacrificial structure to be added to the object model data 102 by the SSG module 402b may be dependent, at least in part, on the characteristic data 106. The characteristic data 106 may, for example, define the conditions or circumstances in which a sacrificial structure may be added to the object model data 102.

The SSG module 402b may then add suitable features to the object model data 102.

For example, the characteristic data 106 may define the conditions under which it may be useful to add anchoring features to the object model data 102 to help ensure that during generation of the object the object is suitably supported or anchored on a build support member of an additive manufacturing system.

The SSG module 402b may then add suitable features to the object model data 102.

For example, the characteristic data 106 may define the conditions under which it may be useful to add additional structural elements to the object model data 102 to help ensure structural integrity of certain features of the object model 103.

The SSG module 402b may then add suitable features to the object model data 102.

For example, the characteristic data 106 may define the conditions under which it may be useful to add a 'heat reservoir' in proximity to a portion of the object 103 to help control the accumulation of heat and hence to control the effect of thermally induced stresses on a generated object. A heat reservoir may comprise, for example, an additional object, such as solid or other non-solid object, that is proximate to the object model 103 and which serves to absorb or emit heat during the generation of a three-dimensional object.

Figure 17:
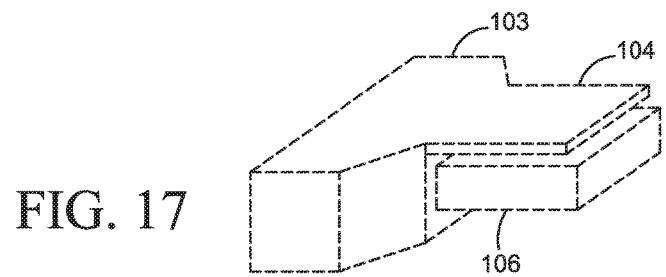
FIG. 17 is an illustration of an object model according to one example.

For example, as shown in FIG. 17, when an object model 103 has an overhanging structure 104, the SSG module 402b may add a sacrificial object 105 to the object model. The added sacrificial object 105 may, for example, have the same, or a similar, shape profile to the overhanging structure 104 and be positioned below the overhanging structure 104, but not connected to structure 104 or any other part of the object. When the object is generated from the model 103 by an additive manufacturing system, the added sacrificial object 105 may act as heat source and may help decrease the thermal gradients experienced by the overhanging structure 104. This may, for example, help reduce the distortion of the overhanging structure. The same technique may also be used for other structural features other than overhanging structures.

The SSG module 402b may then add suitable features to the object model data 102.

Virtual Object Generation

The additive manufacturing system described in PCT Application PCT/EP2014/050841 mentioned above may allow three-dimensional objects to be created that may have controllably variable, or different, object properties within a single generated object. This may allow an object to have, for example, one or more variable properties, that may include: variable accuracy properties; variable surface roughness properties; variable strength properties; variable object porosity properties; variable inter-layer strength properties; variable object elasticity properties; variable density properties; and other variable mechanical or physical properties. For example, a created object may comprise one portion that has a first level of surface roughness, and a second portion that has a second level of surface roughness. Variable object properties may be generated within a generated object by depositing appropriate patterns of a coalescing agent and a coalescence modifier agent on a layer of build material.

An object property may be defined by object property data. The object property data may, for example, be defined within the object model data 102, or may, for example, be defined using external object property data. The object model data may define, for example, that a portion, or the whole, of, an object is intended to have a certain object property, such as a certain surface smoothness. The object property data may also define multiple object properties for a portion or portions of an object.

The generation of a three-dimensional object with controllably variable properties may be possible, for example, by modulating the manner in which agents, such as a coalescing agent and a coalescence modifier agent, are delivered to the layers of build material by the additive manufacturing system used to generate the object.

Figure 8:
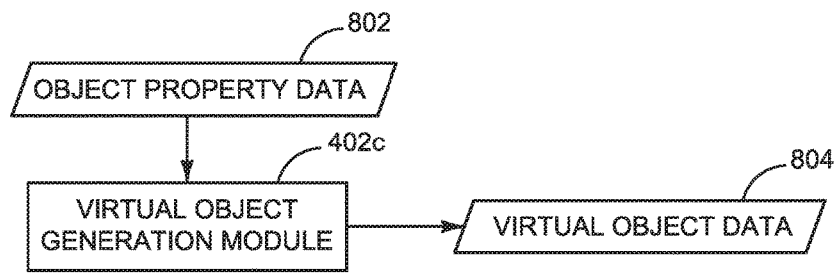
FIG. 8 is a block diagram of a virtual object generation module according to one example.

To enable the generation of variable property objects the object processor 400 may comprise a transformation module that is a virtual object generation (VOG) module 402c, as illustrated in FIG. 8. The VOG module 402c may be present in the object processor 400 in addition to or in substitution of the other modules described herein.

The VOG module 402c generates new 'virtual' objects, defined in virtual object data 804 based on object property data 802. In one example the virtual objects may be incorporated into the object model data 102 or into object model data that has been previously transformed as described above. Virtual objects are objects that are not physically generated by an additive manufacturing system but which may cause one or multiple portions of a generated object to have different object properties. In one example, the virtual objects may modify the way in which slice data 108 is generated.

In one example the VOG module 402c may process original object model data 102. In another example the VOG module 402c may process object model data that has been previously processed by a transformation module.

Figure 9:
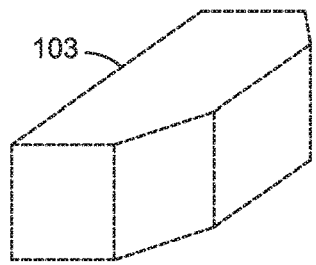
FIG. 9 is an illustration of an object model according to one example.

FIG. 9 shows an object model 103 of object to be generated by an additive manufacturing system, such as the system 302.

Figure 10:
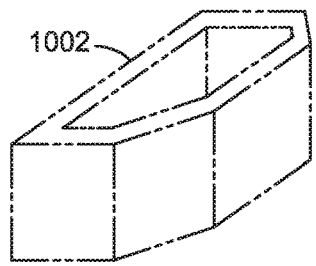
FIG. 10 is an illustration of a virtual object according to one example.

In response to object property data associated with the object model 103, the VOG module 402c may generate a virtual object, such as virtual object 1002, as illustrated in FIG. 10.

A portion or the whole of a generated virtual object may spatially coincide with a portion or the whole of an object model 103. In some examples a virtual object may also not spatially coincide with a portion of an object model 103, but may be proximate thereto.

Figure 11:
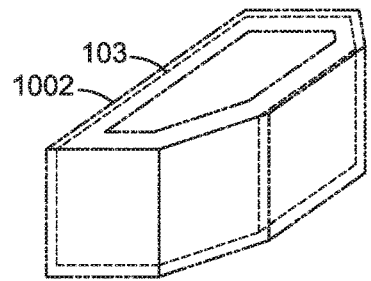
FIG. 11 is an illustration of an object model and virtual object according to one example.

As illustrated in FIG. 11, the generated virtual object spatially coincides with portions of the object model 103. In the example shown it can be seen that the virtual object 1002 spatially coincides with a thin layer of the object 103 around the vertical external sides of the object 103. This could, for example, be as a result of object property data defining that the vertical external sides of the object 103 are to have a different object property than the horizontal sides of the object 103. For example, it may be intended for the object generated from the object model 103 is to have a first level of surface smoothness on its vertical sides, and is to have a second level of surface smoothness on its external horizontal sides.

Slice Generation

Figure 12:
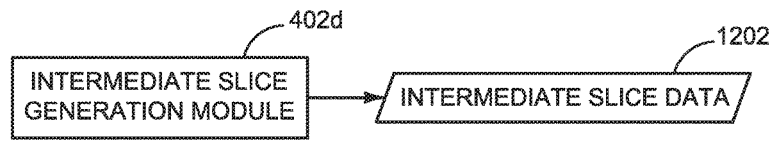
FIG. 12 is a block diagram of an intermediate slice generation module according to one example.

In one example, the object processor 400 comprises a transformation module that is an intermediate slice generation module 402d, as illustrated in FIG. 12. The intermediate slice transformation module 402d may transform the object model data 102 (or modified object model data if this has been modified by another transformation module) into intermediate slice data 1202. In one example the slices are represented in a suitable vector graphics format, represented in only two-dimensions. Each intermediate slice may represent a slice of the modified object model as well as a corresponding slice of any coinciding virtual object generated. In one example, the slice generation module 402d may be present in the object processor 400 in addition to or in substitution of the other modules described herein.

It should be noted, however, that the intermediate slices generated by the slice generation module 402d are not the slice data 108 that is output by the object processor 400. Each generated intermediate slice represents a slice of the modified object model data 102, and each intermediate slice may represent a slice of the modified object model having a predetermined thickness. The thickness of each generated intermediate slice may, for example, be based on the characteristic data 106. In one example, the characteristic data 106 defines the thickness of each layer of build material that is processed by the additive manufacturing system 302. In one example, the thickness of each generated intermediate slice may represent a thickness in the range of about 50 to 200 microns, depending on the nature of the additive manufacturing system 302. In some examples each generated intermediate slice may represent other thicknesses.

In another example the thickness of each generated intermediate slice may be less than the thickness of each layer processed by the additive manufacturing system 302. In one example, the thickness of each generated slice may be in the range of about 10 to 50 microns. If generated intermediate slices are thinner than the thickness of each layer of build material processed by the additive manufacturing system 304 the additive manufacturing system 304 may combine multiple slices before processing a slice of build material. This 'over-sampling' of slices may enable the additive manufacturing system 304 to improve the quality of generated objects, for example, by enabling interpolation of data between adjacent slices. This may be beneficial, for example, if a feature of the object model 103 coincides with a boundary between two layers of build material. In this way, an additive manufacturing system may use multiple slice images to determine a pattern of which one or more agents may be delivered to a layer of build material.

The number of intermediate slices generated by the object processor 100 may be determined from the characteristic data 106.

Slice Modification

Figure 13:
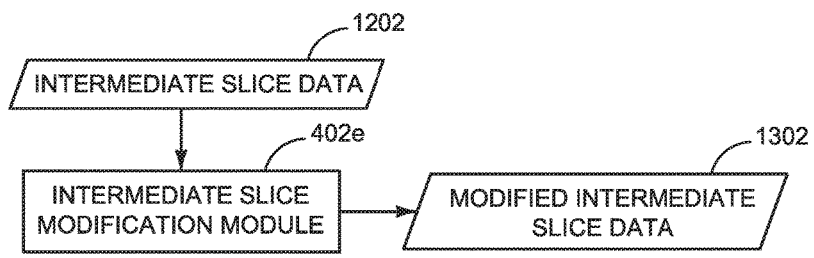
FIG. 13 is a block diagram of an intermediate slice modification module according to one example.

In one example, the object processor 400 comprises a transformation module that is an intermediate slice modification (ISM) module 402e, as illustrated in FIG. 13. In one example, the ISM module 402e may be present in the object processor 400 in addition to or in substitution of the other modules described herein.

In examples where the ISM module 402e is present, the slice modification module 402e may perform geometrical transformations on intermediate slice data 1202 to generate modified intermediate slice data 1302. The transformations performed by the ISM module 402e may be similar in nature, albeit in a two-dimensional slice, to the geometric transformations described above with reference to the geometrical transformation module 402a. Accordingly, when the object processor 400 is to process object model data 102 the slice modification module 402e may obtain the characteristic data 106 and apply a suitable geometrical transformation to the appropriate slice data. In this way an object 304 generated by the additive manufacturing system may better conform to the object model 103 defined in the object model data 102.

For example, transformations to perform operations including geometric scaling and distortion compensation may be performed on generated slices. In one example the transformations applied to the generated slices may be made in addition to transformations performed on the object model data 102. In other examples, at least some transformations performed on the generated slices may be omitted from being performed on the object model data 102.

Final Slice Data Generation

Figure 14:
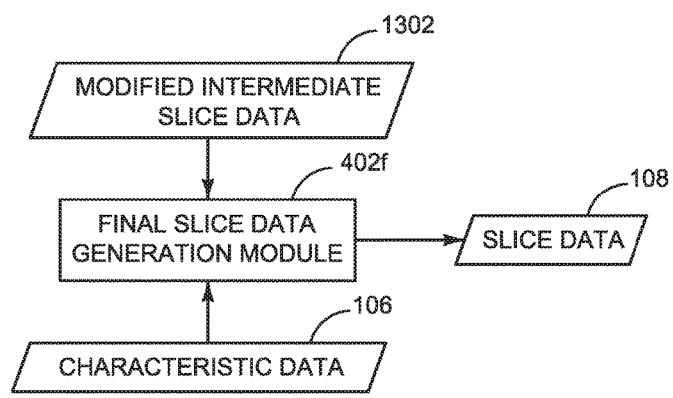
FIG. 14 is a block diagram of a slice data generator module according to one example.

In one example, the object processor 400 further comprises a transformation module that is a final slice data generation (FSDG) module 402f, as illustrated in FIG. 14.

In one example the FSDG module 402f processes the modified intermediate slice data 1302 to generate final slice data 108 taking into account the characteristic data 106. In one example the FSDG module 402f processes the unmodified intermediate slice data 1202 to generate final slice data 108 taking into account the characteristic data 106.

As previously mentioned, the final slice data 108 represents multiple slices of the transformed object model, with each slice represented as an image, as illustrated in FIG. 2. In one example, each slice image is generated to be a continuous tone or 'contone' image represented in a suitable bitmap or rasterized format representing multiple channels, or separations, each having an appropriate bit depth. In one example a suitable bit depth may be 8 bits, although in other examples other bit depths may be used.

The generation of contone images for each slice may involve, for example, converting vector data of each slice into solid and non-solid areas, based on the geometries defined for each slice.

In one example, each generated contone image may define, for each pixel of the contone image, a density or quantity of an agent that is to be deposited at a corresponding location on a layer of build material. For example, in a contone image having a bit depth of 8 bits, each pixel of the contone image may represent one of 256 (zero to 255) levels. The application of different quantities of agent at different locations on a layer of build material may enable an object to be generated having variable object properties, as described above.

The generated contone image for each slice defines, for each of the agents available in the additive manufacturing system 302, the portions of a layer of build material on which each of the agents are to be delivered by the additive manufacturing system 302. For example, if the additive manufacturing system 302 uses two agents, such as a coalescing agent and a coalescence modifier agent, one channel, or separation, of the image may be used to represent those portions of a layer of build material on which a first agent is to be deposited, and one channel, or separation, may be used to represent those portions of a layer of build material on which a second agent is to be deposited.

The generation of the different channels for each image slice may be based, for example, on the presence of a portion of the modified object model and a portion of a virtual object.

For example, if a modified intermediate image slice comprises only a portion of the modified object model, the FSDG module 402f may generate an image slice that comprises only a contone image corresponding to portions of a layer of build material where a coalescing agent is to be deposited.

If, however, a modified intermediate image slice comprises spatially overlapping portions of both the modified object model and a virtual object, the FSDG module 402f may generate an image slice that comprises a contone image corresponding to portions of a layer of build material where a coalescing agent is to be deposited, and a contone image corresponding to portions of a layer of build material where a coalescence modifier agent is to be deposited.

For example, if the spatially overlapping portion of the virtual object indicates that a specific object property is intended, the FSDG module 402f will determine the appropriate patterns in which coalescing agent and coalescing modifier agent are to be deposited on a layer of build material. In this way, when the object is generated by the additive manufacturing system 302 that portion of the generated object will have the intended object property.

The specific manner in which the patterns, ratios, densities, etc. of coalescing agent and coalescence modifier agent that, when deposited on a layer of build material, may be used to generate different object properties may be determinable, for example, from the characteristic data 106, or from any suitable source.

Example Pipeline

Figure 15:
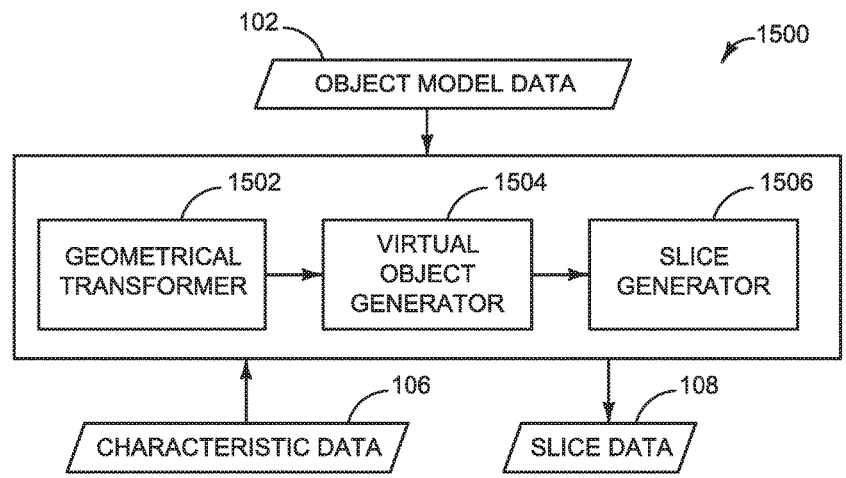
FIG. 15 is a block diagram of a processing pipeline according to one example.

As described above, the object processor 100 may comprise a number of different types of transformation modules 402. The exact configuration of the object processor 100 may depend on numerous factors. The object processor 100 may thus act, in one example, as a processing pipeline in which different transformation modules may sequentially process object model data to generate slice data to drive an additive manufacturing system. FIG. 15 shows a block diagram of a processing pipeline 1500 according to one example, The example processing pipeline 1500 comprises a geometrical transformer 1502 that obtains object model data 102. The geometrical transformer 1502 may perform geometrical transformations on the object data 102 as described above.

The output of the geometrical transformer 1502 may then be processed by a virtual object generator 1504, as described above, and that may generate one or multiple virtual objects.

The output of the virtual object generator 1504 may then be processed by a slice generator 1508, as described above, to generate output slide data 108.

One of more of the modules 1502, 1504, and 1506 may make use of characteristic data 106, as described above.

In other examples other architectures of processing pipelines may be used, for example comprising more or less transformation modules than the processing pipeline 1500.

Final Step

The generated slice data 108 may then be supplied to an additive manufacturing system to generate the three-dimensional object represented thereby. An additive manufacturing system may, for example, perform additional processing on the slice data, for example as part of the data processing pipeline of the additive manufacturing system. The data processing pipeline, which may in some examples be similar in nature to a data processing pipeline in an inkjet printing system, may perform additional processing which may include halftoning operations, print masking operations, swath cutting operations, and the like.

Figure 16:
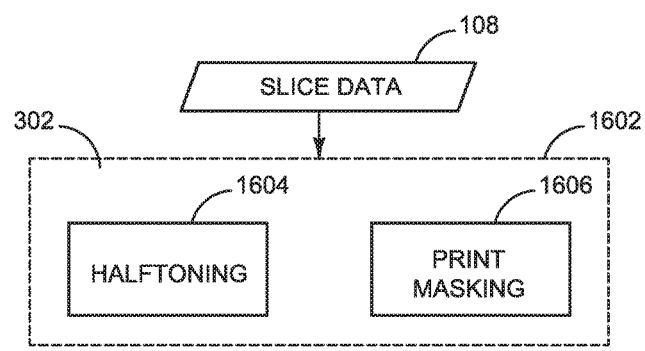
FIG. 16 is a block diagram of a portion of an additive manufacturing system according to one example.

FIG. 16 illustrates a portion of an additive manufacturing system 302 that comprises a data processing pipeline 1602. The additive manufacturing system data processing pipeline 1602 obtains the slice data 108 and transforms the slice data 108 into data suitable to control the additive manufacturing system to generate a three-dimensional object according to the slice data.

In one example the data processing pipeline 1502 may comprise a halftoning module 1604 and a print masking module 1606. In other examples the data processing pipeline 1602 may comprise additional or alternative processing modules.

The halftoning module 1604 may, for example, transform the contone image of each slice into halftone data that defines the locations or patterns in which drops of agent are to be deposited on a layer of build material.

The print masking module 1606 may, for example, transform the halftone data into data that defines the timing of when the additive manufacturing system 302 deposits those drops of agent. This may depend, for example, on whether mechanism used to deposit the drops of agent uses, for example, a page wide array of printhead nozzles, or a scanning printhead.

In one example the object processor 400 may be integrated into an additive manufacturing system such as the additive manufacturing system 302.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement examples described herein. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A system for generating a three-dimensional object from three-dimensional object data, comprising:
   a processing system to:
      obtain characteristic data including conditions under which a heat reservoir may be added close to a portion of the object;
      based on the characteristic data, add sacrificial structure data to the three-dimensional object data, the sacrificial structure data representing a sacrificial heat reservoir structure to be generated during generation of the three-dimensional object close to a portion of the object and not connected to the object; and
      generate multiple slice images from the three-dimensional object data including the sacrificial structure data, each slice image defining a portion of a layer of build material where a coalescing agent is to be delivered during generation of the three-dimensional object and the sacrificial heat reservoir structure; and
   a manufacturing system to generate the three dimensional object and the sacrificial heat reservoir structure based on the slice images.

2. The system of claim 1, wherein the processing system is to:
   obtain characteristic data including one or more of a scaling factor corresponding to an ambient temperature during manufacturing, data defining an age of a build material, data defining a humidity level of a build material, data defining a particle size of a powdered build material, and data defining characteristics of a coalescing agent;
   perform a geometrical transformation on the three-dimensional object data based on the characteristic data to compensate for distortions introduced by the additive manufacturing system during the generation of the three-dimensional object, to generate transformed three-dimensional object data;
   add the sacrificial structure data to the transformed three-dimensional object data; and
   generate the slice images from the transformed three-dimensional object data including the sacrificial structure data.

3. The system of claim 2, wherein the processing system is to:
   generate virtual object data based on object property data; and
   incorporate the virtual object data into the three-dimensional object data or into the transformed three-dimensional object data.

4. The processing system of claim 3, wherein each slice image defines a portion of a layer of build material where a coalescing agent and a coalescence modifier agent is to be delivered by the additive manufacturing system during the generation of the three-dimensional object and the sacrificial heat reservoir structure, according to the transformed three-dimensional object data.

5. The processing system of claim 1, wherein the portion of the object is an overhang and the sacrificial structure data represents a sacrificial heat reservoir structure to be generated during generation of the three-dimensional object close to and below the overhang.

6. A method of processing three-dimensional object data representing a three-dimensional object to be generated by an additive manufacturing system, comprising:
   performing a geometrical transformation on the three-dimensional object data to compensate for distortions introduced by the additive manufacturing system during the generation of the three-dimensional object, to generate transformed three-dimensional object data;
   obtaining characteristic data including conditions under which a heat reservoir may be added close to a portion of the object;
   based on the characteristic data, adding sacrificial structure data to the transformed three-dimensional object data, the sacrificial structure data representing a sacrificial heat reservoir structure to be generated during generation of the three-dimensional object close to a portion of the object and that does not form part of the three-dimensional object;
   generating multiple slice images from the transformed three-dimensional object data including the sacrificial structure data, each slice image defining a portion of a layer of build material where a coalescing agent is to be delivered by the additive manufacturing system during generation of the three-dimensional object and the sacrificial heat reservoir structure; and generating the three dimensional object and the sacrificial heat reservoir structure based and on the slice images.

7. A non-transitory non-volatile storage comprising machine readable instructions that when executed by a controller cause an additive manufacturing system to:
obtain characteristic data including conditions under which a heat reservoir may be added close to a portion of the object;
based on the characteristic data, add sacrificial structure data to the three-dimensional object data, the sacrificial structure data representing a sacrificial heat reservoir structure to be generated during generation of the three-dimensional object close to a portion of the object and not connected to the object; and
generate multiple slice images from the three-dimensional object data including the sacrificial structure data, each slice image defining a portion of a layer of build material where a coalescing agent is to be delivered during generation of the three-dimensional object and the sacrificial heat reservoir structure; and
generate the three dimensional object and the sacrificial heat reservoir structure based on the slice images.

8. The non-volatile storage of claim 7, wherein the machine readable instructions cause the additive manufacturing system to:
obtain characteristic data including one or more of a scaling factor corresponding to an ambient temperature during manufacturing, data defining an age of a build material, data defining a humidity level of a build material, data defining a particle size of a powdered build material, and data defining characteristics of a coalescing agent;
perform a geometrical transformation on the three-dimensional object data based on the characteristic data to compensate for distortions introduced by the additive manufacturing system during the generation of the three-dimensional object, to generate transformed three-dimensional object data;
add the sacrificial structure data to the transformed three-dimensional object data; and
generate the slice images from the transformed three-dimensional object data including the sacrificial structure data, each slice image defining a portion of a layer of build material where a coalescing agent is to be delivered during generation of the three-dimensional object and the sacrificial heat reservoir structure.

9. The non-volatile storage of claim 8, wherein the machine readable instructions cause the additive manufacturing system to:
generate virtual object data based on object property data; and
incorporate the virtual object data into the three-dimensional object data or the transformed three-dimensional object data.

10. The non-volatile storage of claim 9, wherein each slice image defines a portion of a layer of build material where a coalescing agent and a coalescence modifier agent is to be delivered by the additive manufacturing system during the generation of the three-dimensional object and the sacrificial heat reservoir structure, according to the transformed three-dimensional object data.

11. The non-volatile storage of claim 7, wherein the portion of the object is an overhang and the sacrificial structure data represents a sacrificial heat reservoir structure to be generated during generation of the three-dimensional object close to and below the overhang.

* * * * *